United States Patent [19]

Sniadach

[11] Patent Number: 4,872,721

[45] Date of Patent: Oct. 10, 1989

[54] AUTOMOTIVE SUNSCREEN

[76] Inventor: James R. Sniadach, 1871 Page #3, San Francisco, Calif. 94117

[21] Appl. No.: 230,601

[22] Filed: Aug. 10, 1988

[51] Int. Cl.4 ................................. B60J 3/00
[52] U.S. Cl. ................................ 296/97.2; 296/97.7; 296/97.11; 248/205.2; 248/205.5; 248/206.5; 248/558; 248/683
[58] Field of Search .................... 296/97.1, 97.2, 97.7, 296/97.9, 97.11; 248/205.2, 205.5, 205.8, 205.9, 206.5, 359 A, 558

[56] References Cited

U.S. PATENT DOCUMENTS

| | | | |
|---|---|---|---|
| 1,228,545 | 6/1917 | Fitzgerald | 248/205.5 |
| 1,313,083 | 8/1919 | Geist | 296/97.2 |
| 1,606,853 | 11/1926 | Trisler | 296/97.7 |
| 1,953,877 | 4/1934 | Chase | 248/205.5 |
| 2,706,659 | 4/1955 | Landis | 296/97.7 |
| 2,711,923 | 6/1955 | Parks | 296/97.7 |
| 2,715,043 | 8/1955 | Schewel | 296/97.7 |
| 3,022,109 | 2/1962 | Hauskama | 248/359 A X |
| 3,282,623 | 11/1966 | Paro | 296/97.8 |
| 4,648,572 | 3/1987 | Sokol | 248/205.2 X |
| 4,707,008 | 11/1987 | Falco | 293/128 |
| 4,762,358 | 8/1988 | Levosky et al. | 296/97.7 |
| 4,779,831 | 10/1988 | Anderson | 248/205.2 X |

FOREIGN PATENT DOCUMENTS 2650785  5/1978  Fed. Rep. of Germany ..... 296/97.7

Primary Examiner—Robert B. Reeves
Assistant Examiner—Joseph D. Pape
Attorney, Agent, or Firm—Leon Gilden

[57] ABSTRACT

An automotive sunscreen is set forth wherein an opaque sunscreen is fixedly secured to an elongate support post which can be hand held. The support post is formed at a free end thereof with a resilient suction cup for securing the sunscreen. Additionally, a plurality of telescopingly retractable securement elements are positionable within the handle including a magnetic attachment member with a VELCRO (T.M.) telescopingly positionable therethrough. Additionally, the sunscreen apparatus is formed utilizing photochromic glass to darken in the presence of light.

6 Claims, 1 Drawing Sheet

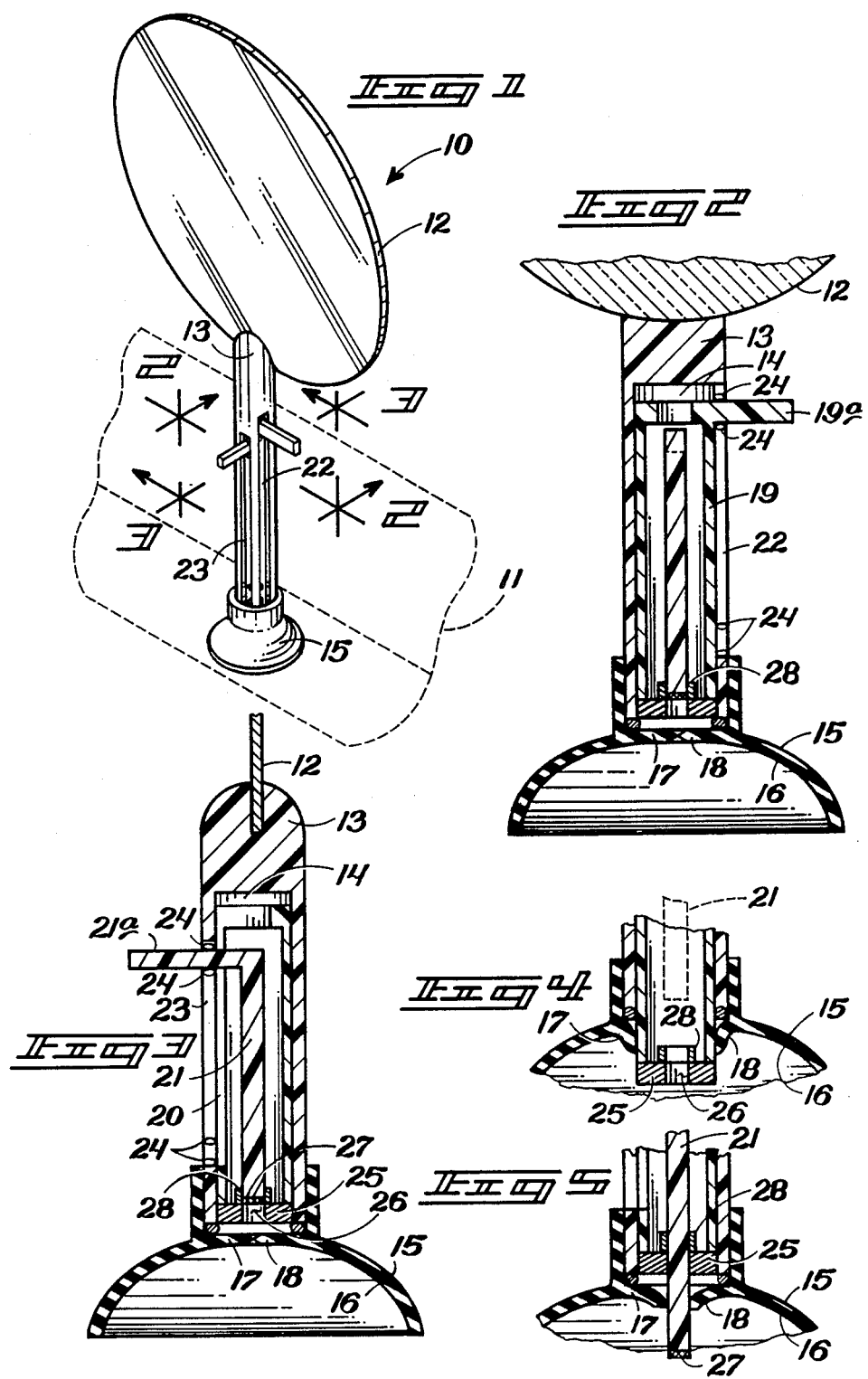

AUTOMOTIVE SUNSCREEN

BACKGROUND OF THE INVENTION

1. Field of the Invention

The field of invention relates to automotive sunshields, and more particularly to a new and improved automotive sunshield securable to a variety of support surfaces.

2. Description of Prior Art

The use of various sunscreens in automotive environments is well known in the prior art. The devices have generally been formed of transparent and opaque materials of various types, but none that would change the presence of light, such as the use of photochromic glass or that can be hand held as utilized by the instant invention. Additionally, the sunscreens have employed attachment means not typically adaptable for securement from one type of attachment surface to another.

For example, U.S. Pat. No. 1,228,546 to Fitzgerald sets forth a sunscreen pivotally secured to a suction cup for attachment to a windshield. The suction cup is orthogonally secured to the windshield and enable attachment to a singular type of surface, as opposed to the instant invention.

U.S. Pat. No. 1,606,853 to Trisler sets forth another example of a suction mounted sunscreen that is pivotally and frictionally mounted to a suction cup to reposition the screen as desired when secured to an associated windshield.

U.S. Pat. No. 1,958,877 to Chase sets forth another suction cup glare shield for use in association with an automotive windshield wherein the shield is remotely secured to the suction cup by an elongate arm pivotally attached to the shield and to the suction cup to enhance adjustment of the shield relative to the automotive windshield.

U.S. Pat. No. 2,706,659 to Landis utilizes a glare shield adjustably mountable along an elongate arm wherein a terminal end of said arm is pivotally securable to a suction cup to enable pivotal and radial adjustment of the shield relative to the suction cup.

U.S. Pat. No. 2,715,043 to Schewel sets forth a sun visor with an orthogonally mounted suction cup for attaching the visor to a windshield wherein a perimeter rib secures a transparent plastic utilizing a quantity of light absorbing dye to provide a non-glaring transparent surface.

U.S. Pat. No. 3,282,628 to Paro sets forth a sunscreen attachable to a glass surface wherein the screen is mounted by an articulated ball and socket mounting relative to the securement suction cup for adjustment of the screen relative to the mounting.

As such, it may be appreciated that there is a continuing need for a new and improved automotive sunscreen that addresses both the problems of adaptability in securement to a plurality of surfaces and further utilizes a photochromic glass for adapting to various light conditions, and in this respect the present invention substantially fulfills this need.

SUMMARY OF THE INVENTION

In view of the foregoing disadvantages inherent in the known types of sunscreens now present in the prior art, the present invention provides an automotive sunscreen wherein the same may be compactly stored during periods of non-use and may be further efficiently and readily secured and attached to various surfaces or hand held to effect a sunscreen of an occupant of an associated automobile. As such, the general purpose of the present invention, which will be described subsequently in greater detail, is to provide a new and improved automotive sunscreen which has all the advantages of the prior art sunscreens and none of the disadvantages.

To attain this, the present invention comprises an opaque or preferably transparent photochromic glass to darken in the presence of light in a degree directly proportional to the intensity of light presented wherein the transparent member is fixedly secured to a support post provided with a plurality of attachment elements reciprocatably and nestably positioned within the handle including a suction cup fixedly secured to a terminal end of the post with a first magnet secured to a first reciprocating member and a VELCO (T.M.) tipped second reciprocating member reciprocatable and nestable therein.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive sunscreen which has all the advantages of the prior art automotive sunscreens and none of the disadvantages.

It is another object of the present invention to provide a new and improved automotive sunscreen which may be easily and efficiently manufactured and marketed.

It is a further object of the present invention to provide a new and improved automotive sunscreen which is of a durable and reliable construction.

An even further object of the present invention is to provide a new and improved automotive sunscreen which is susceptible of a low cost of manufacture with regard to both materials and labor, and which accordingly is then susceptible of low prices of sale to the consuming public, thereby making such automotive sunscreen economically available to the buying public.

Still yet another object of the present invention is to provide a new and improved automotive sunscreen which provides in the apparatuses and methods of the prior art some of the advantages thereof, while simultaneously overcoming some of the disadvantages normally associated therewith.

Still another object of the present invention is to provide a new and Improved automotive sunscreen including a hand held support post provided with a plurality of attachment means including a suction cup, magnet, and VELCRO (T.M.) attachment members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view of the instant invention taken along the lines 2—2 of FIG. 1.

FIG. 3 is an orthographic view taken along the lines 3—3 of FIG. 1 in the direction indicated by the arrows.

FIG. 4 is an orthographic sectional view of the magnet attachment member in a partially extended position.

FIG. 5 is an orthographic sectional view of the Velcro (T.M.) member in a partially extended position.

DESCRIPTION OF THE PREFERRED EMBODIMENT

With reference now to the drawings, and in particular to FIGS. 1 to 5 thereof, a new and improved automotive sunscreen embodying the principles and concepts of the present invention and generally designated by the reference numeral 10 will be described.

More specifically, it will be noted that the automotive sunscreen apparatus 10 essentially comprises an assembly securable to an automotive interior and typically to a dash board 11, as illustrated in phantom in FIG. 1. The sunscreen apparatus 10 includes a screen 12 comprises of photochromic glass to darken in direct proportion to the intensity of light directed to the screen 12. The photochromic screen 12 is integrally secured to an elongate support rod 13 formed with a cylindrical cavity 14 therewithin. Securely adhered to a terminal free end of the support rod 13 is a resilient suction cup 15 formed with an interior hemispherical cavity 16 with a first tab 17 and a second tab 18 medially formed within said interior cavity 16 flexibly and resiliently covering the cylindrical cavity 14.

Within the cavity 14 is a hollow tubular member 19 formed with an outwardly projecting first handle 19a reciprocatable within the cavity 14 along a first rod slot 22 of the rod 13, as illustrated in FIG. 2. The hollow tubular member 19 is formed with an "L" shaped slot 20 to enable reciprocation of the member 19 past a rod member 21. The rod member 21 is formed with a second handle 21a directed outwardly through the "L" shaped slot 20 and a second rod slot 28 formed within the support rod 18. The respective first and second rod slots 22 and 23 are formed with capture projections 24 to resiliently capture the respective first and second handles 19a and 21a in respective retracted or extended positions and maintain the respective tubular member 19 or rod member 21 in an extended or retracted position. Formed at a forward terminal end of the tubular member 19 is a cylindrical magnet 25 formed with an axial board 26. The axial board 26 allows the rod member 21 to reciprocate therethrough wherein a forward free end of the rod member 21 is formed with VELCRO (T.M.) type hooks for securement to a fabric-like surface. The magnet 25 enables upon extension of the tubular member 19 as illustrated in FIG. 4, attachment of the sunscreen 10 to a metallic surface. A resilient cylindrical seal 28 formed integrally to the upper portion of cylindrical magnet 25 about the bore 26 sealingly secures and maintains an airtight adhesion of the suction cup 25 as well as do the cooperative nature of the first and second tabs 17 and 18 that resiliently allow the respective tubular member 19 and the rod member 21 to pass therethrough.

Accordingly, it may be appreciated that the automotive sunscreen 10 may be secured to a variety of metallic, nonmetallic, and fabric surfaces for attachment.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters of Patent of the Unites States is as follows:

1. An automotive sunscreen apparatus for attachment to an automotive interior comprising,
    a planar sunscreen member for limiting passage therethrough, and
    an elongate support defined by a central axis integrally secured to and axially aligned with said sunscreen member, and
    said support including a plurality of securement means for securing said support to a plurality of various surfaces, and
    wherein said planar screen member is opaque, and
    wherein said planar sunscreen member is formed of photochromic material to progressively darken when exposed to progressively brighter light conditions, and wherein said securement means includes a resilient suction cup integrally secured to a distal end of said elongate support, and wherein said support means further includes a hollow tubular member reciprocally slidable from interiorly of said support to a position exteriorly thereof with a magnet secured at an end thereof for attachment to a surface.

2. An automotive sunscreen apparatus as set forth in claim 1 wherein said securement means further includes a rod member with a plurality of loop fastening elements integrally secured to an end thereof for attachment to a fabric surface.

3. An automotive sunscreen apparatus as set forth in claim 2 wherein said suction cup includes a plurality of tab means medially of said suction cup for displacement upon projection of said tubular member or said rod member axially of said support means.

4. An automotive sunscreen apparatus as set forth in claim 3 wherein said magnet includes a bore axially thereof for accepting said rod member therethrough.

5. An automotive sunscreen apparatus as set forth in claim 4 wherein said tubular member and said rod member respectively include a first and second handle orthogonally thereto and projecting outwardly of said support through respective axial slots.

6. An automotive sunscreen apparatus as set forth in claim 5 wherein said axial slots include capture projections for securement of said first and second handles in a retracted or extended position.

* * * * *